United States Patent
Goossens et al.

[11] Patent Number: 5,333,946
[45] Date of Patent: Aug. 2, 1994

[54] ELECTROMAGNETIC VALVE FOR ANTISLIP HYDRAULIC BRAKE SYSTEMS

[75] Inventors: Andre F. L. Goossens, Rumst, Belgium; Karlheinz Seitz, Lorsch; Josef Lauer, Nonneweiler, both of Fed. Rep. of Germany

[73] Assignee: Alfred Teves GmbH, Frankfurt am Main, Fed. Rep. of Germany

[21] Appl. No.: 859,403
[22] PCT Filed: Aug. 3, 1991
[86] PCT No.: PCT/EP91/01466
§ 371 Date: May 27, 1992
§ 102(e) Date: May 27, 1992
[87] PCT Pub. No.: WO92/05989
PCT Pub. Date: Apr. 16, 1992

[30] Foreign Application Priority Data
Sep. 27, 1990 [DE] Fed. Rep. of Germany ....... 4030571

[51] Int. Cl.⁵ .................................................. B60T 8/36
[52] U.S. Cl. ............................... 303/119.2; 251/129.15
[58] Field of Search ................ 303/119.2, 9.75, 116.1; 251/367, 129.15, 129.07

[56] References Cited
U.S. PATENT DOCUMENTS

| 3,707,992 | 1/1973 | Ellison et al. ............ 251/129.15 X |
| 3,865,140 | 2/1975 | Greenwood .................. 137/625.64 |
| 4,624,282 | 11/1986 | Fargo ........................ 137/599.2 |

FOREIGN PATENT DOCUMENTS

| 7830675 | 2/1978 | Australia . |
| 0280387 | 9/1987 | European Pat. Off. . |
| 1781250 | 1/1959 | Fed. Rep. of Germany . |
| 2504972 | 8/1976 | Fed. Rep. of Germany . |
| 3102233 | 3/1982 | Fed. Rep. of Germany . |
| 3138579 | 4/1983 | Fed. Rep. of Germany . |
| 3214995 | 10/1983 | Fed. Rep. of Germany . |
| 8319137 | 11/1983 | Fed. Rep. of Germany . |
| 3502730 | 7/1986 | Fed. Rep. of Germany . |
| 3701019 | 7/1988 | Fed. Rep. of Germany . |
| 3729216 | 3/1989 | Fed. Rep. of Germany . |
| 3810581 | 10/1989 | Fed. Rep. of Germany . |
| 3810788 | 10/1989 | Fed. Rep. of Germany . |
| 4003606 | 12/1990 | Fed. Rep. of Germany . |
| 2619871 | 3/1989 | France . |
| 2640022 | 6/1990 | France . |
| 9015736 | 12/1990 | PCT Int'l Appl. . |
| 9204214 | 3/1992 | PCT Int'l Appl. ............. 303/119.2 |

Primary Examiner—Robert J. Oberleitner
Assistant Examiner—Lee W. Young
Attorney, Agent, or Firm—Robert P. Seitter; J. Gordon Lewis

[57] ABSTRACT

The valve sleeve (3) of an electromagnetic valve is secured to a housing by a friction grip, and also a formed interlock using a bushing (1) inserted in a housing bore of a valve housing (2). To enhance the holding force effective on contact faces between valve housing (2), valve sleeve (3) and bushing (1), the friction grip is supplemented by a formed interlock therebetween, with interfit corrugations or a conical-cylindrical combined shape, effective between the contacting faces, to better resist thrust forces exerted by pressure within the sleeve.

5 Claims, 1 Drawing Sheet

ELECTROMAGNETIC VALVE FOR ANTISLIP HYDRAULIC BRAKE SYSTEMS

BACKGROUND OF THE INVENTION

The present invention is concerned with an electromagnetic valve, especially for hydraulic brake systems having a slip control.

In conventionally used electromagnetic valves of the type as set out, for example, in DE-OS 37 29 216, valve sleeves are inserted into a valve housing of a steel valve block configuration and formed to be friction locked and sealed therein. When using electromagnetic valves closed in the de-energized normal condition, the valve sleeve forms the actual magnetic core of the magnetic coil. Located in the inner chamber of the valve sleeve is the magnetic armature actuating the needle valve. When used as an electromagnetic valve open in the de-energized basic position, a bushing provided at the fixing seam of the valve sleeve assumes the function of the magnetic core.

The forming of the sleeve is accomplished by means of a tool driven into the valve block housing to establish the friction-locking connection of the valve sleeve, which is thereby clamped between the valve housing and the bushing.

Especially when considering the relatively high hydraulic test pressures within the valve sleeve, the conventional friction-locking fixation of the valve sleeve requires some improvement in order to prevent the valve sleeve from loosening as a result of pressure induced thrust strain occurring between the contact surfaces.

It is, therefore, the object of the invention to enhance the holding force on the contact faces, while at the same time maintaining the friction-locking connection between valve housing, valve sleeve and bushing.

SUMMARY OF THE INVENTION

This problem, in the practice of the invention, is solved by forming interlocking features into the mating surfaces of the valve sleeve, housing and bushing, configured to resist the pressure induced separating forces on the valve sleeve.

Hence, the invention solves the problem by augmenting the friction-locking connection by a form interlock effective between the contact faces for better resisting the thrust forces within the mounting.

In one embodiment applying the principle of the invention, it has proved to be extremely effective to provide a recess in a cylindrical surface of the bushing adjacent the conventional frusto-conical surface, the recess receiving an extended length end portion of the valve sleeve, also of cylindrical shape acting as an interlocking feature.

Alternatively, the frusto-conical surface of the bushing, in the area overlain by the valve sleeve, may be provided with a fillet-type circumferential radius. The alternating bending of the clamped-in valve sleeve forms a corrugation shape establishing the interlocked shape, and hampers slipping of the valve sleeve out of the formed connection, thereby enabling high thrust forces to be transferred.

The valve sleeve is preferably constructed by deep drawing of stainless steel so that together with cold forming of the bushing connection, work hardening results in a high strength valve sleeve.

The invention will now be described in greater detail with reference to a variety of examples of embodiment.

DETAILED DESCRIPTION

Figure 1:
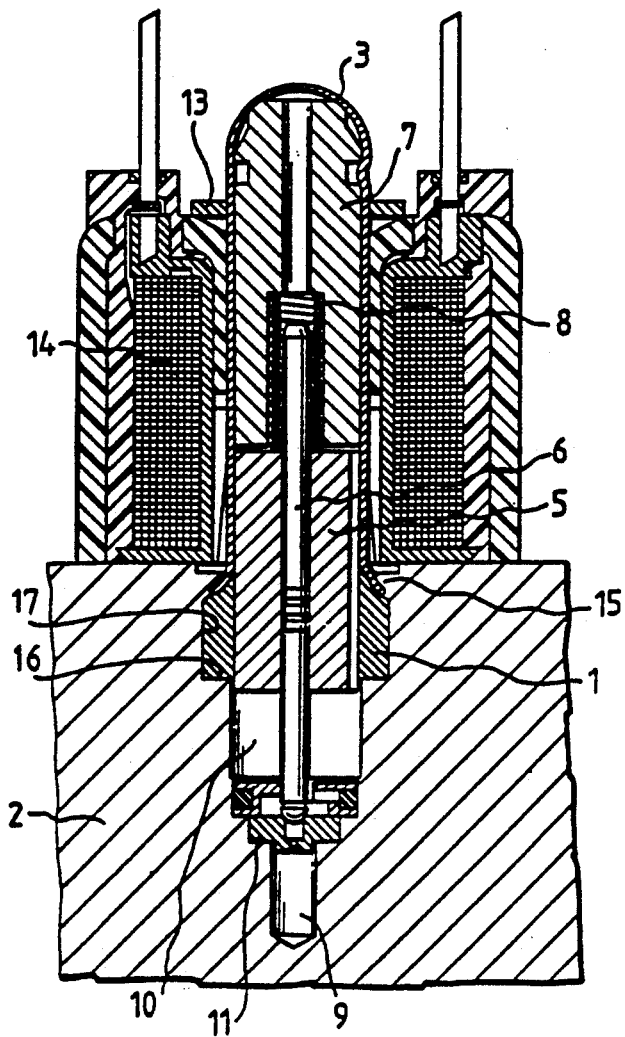
FIG. 1 is a partially sectional view of the electromagnetic valve according to the invention and a fragmentary portion of the housing in which the valve is mounted.

Referring to the drawings, FIG. 1 shows, in cross-section, the valve sleeve 3 cold formed onto the bushing 1 in the valve housing 2. As shown, the bushing 1 has one end received against a step 16 of a counterbore 17 in the valve housing 2. The valve sleeve 3 is made of non-magnetic stainless steel by deep drawing. The valve sleeve 3, in the cavity thereof, accommodates the magnetic armature 5 with the needle valve as well as the magnetic core 7. Located in a stepped bore of the magnetic core 7, in coaxial arrangement over the magnetic armature 5, is a compression spring 8 which is clamped over the extension of the needle valve 6 and disposed on the front side of the magnetic armature 5. Valve seat 11 is held by means of a forming in the area of the pressure fluid channel 9 recessed in the valve housing 2, within a stepped housing bore 10. Moreover, the magnetic coil 14 is locked on the valve sleeve 3 by means of a grip ring 13.

The deep-drawing process for manufacturing the valve sleeve 3, especially when using stainless steel, will result in a work hardening so that, in maintaining a degree of efficiency of the magnetic circuit determined by the strength of the wall of the valve sleeve 3, a high-pressure resistant valve sleeve 3 can be manufactured that is of a high strength as opposed to the soft-annealed welding or hard solder compounds. As high pressure is applied to the complete inner space of the valve sleeve 3 when using the electromagnetic valve for hydraulic brake systems, this method of manufacture and fixation of the valve sleeve 3 proves to be extremely advantageous.

To insure withstanding of maximum operating pressures, the valve sleeve 3 is fixed within the valve housing 2 by an additional feature to the friction-locking connection between the frusto-conical contact surface 19 of the bushing 1, the skirt of valve sleeve 3, and the bore of the valve housing 2 receiving the bushing 1.

Figure 2:
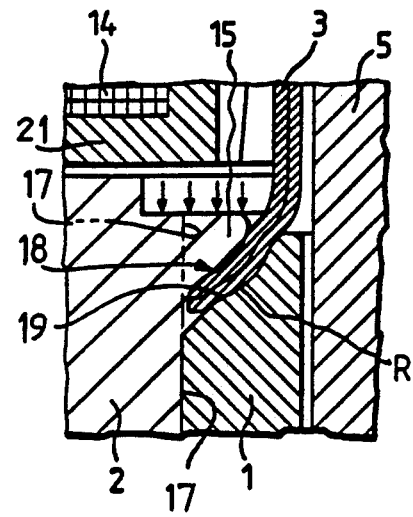
FIG. 2 shows an enlarged section of the valve sleeve for fixing to the valve housing according to FIG. 1 showing the formed connection of the valve sleeve.

The form-locking connection according to the invention is shown in enlarged scale in FIG. 2. The bushing 1 is held against the shoulder 11 with the frusto conical surface 19 recessed in bore 17 to be below the surface 20 of the housing 2 into which the bore 17 enters. A skirt portion 18 of the valve sleeve 3 is positioned over a frusto conical face 19 of the bushing 1. A cold forming tool (not shown) is used to displace the material of the housing 2 axially down as indicated by the arrows in FIG. 2, causing the material to move radially in to form a nose 15. A nose 15 thus overlies the frusto conical end face 19 of the bushing 1 with the skirt portion 18 interposed locking the skirt portion 18 of the valve sleeve 3 therebetween. Furthermore, the frusto-conical surface of bushing 1 is provided with alternating concave and convex surface features to form a corrugated surface, so that, after forming of the nose 15 in the valve housing 2, the thin-walled valve sleeve 3 is interfitted to the corrugated surface of the bushing 1 creating interlocked features shear loaded so as to resist the action of enhanced thrust forces resulting from high inner pressures. This interfitting is effective, in addition to the surface friction, to prevent the valve sleeve 3 from slipping out of the mount.

Figure 3:
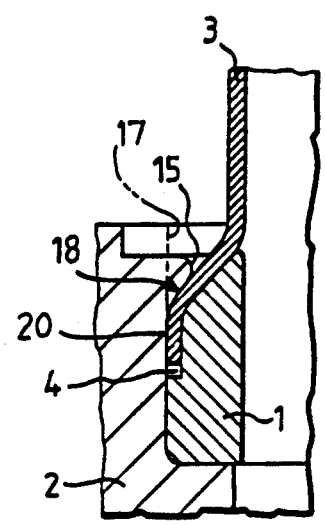
FIG. 3 shows another embodiment of the valve sleeve formed connection to the valve housing according to the invention.

FIG. 3 shows an alternative form of embodiment for providing a form-lock mounting of the valve sleeve 3 within the valve housing 2.

In this embodiment, bushing 1 is provided at least partially throughout a cylindrical surface thereof with an axially extending recess 4 which receives an elongated formed extension 20 of the skirt portion 18 of the valve sleeve 3 between bushing 1 and valve housing 2 to thereby attain an increased area of the contacting surfaces for the purpose of an improved friction-locking connection. The cylindrical portion combined with the frusto-conical portion of the matching surfaces provides a form interlock. Additionally, a tight grip is caused by deformation of the extension 20 valve sleeve 3 to be fit onto the cylindrical surface of the recess 4 of bushing 1 so that the combination of a friction grip and form-lock clearly insures a safe mounting of valve sleeve 3 between bushing 1 and valve housing 2.

We claim:

1. An electromagnetic valve for use with brake systems having a slip control, comprising a housing having a bore formed therein, a generally cylindrical valve sleeve closed at one end and formed with a skirt portion at the other end, a bushing received into said housing bore of valve housing against a shoulder thereof, a magnetic armature enclosed by said valve sleeve, a magnetic coil, mounted over said valve sleeve, a needle valve within said valve sleeve driven by said magnetic armature and partially enclosed by said magnetic core, a valve seat mounted in said valve housing aligned with said needle valve and positioned so that said needle valve is driven to be seated thereon by energization of said magnetic coil, said bushing formed at an end opposite said housing bore shoulder with a frusto-conical surface, said skirt portion of said valve sleeve overlying said frusto conical surface of said bushing; material of said valve housing around said bore extending axially inwardly toward said shoulder and also radially inwardly to overlie said frusto-conical bushing surface with said valve sleeve skirt portion interposed therebetween to create a frictional and interlocked connection of said valve sleeve to said valve housing, with interfit shaped portions of said bushing, valve housing, and valve sleeve skirt portion positively resisting separating forces to increase resistance of said connection to said separating forces.

2. An electromagnetic valve according to claim 1, wherein said interfit portions corrugated surface portions of said frusto-conical surface of said bushing, with said valve sleeve skirt portion formed into said corrugated bushing surface of said housing around said housing bore.

3. An electromagnetic valve according to claim 1, wherein said interfit portions include a cylindrical recess on said bushing adjacent said frusto-conical surface, a cylindrical extension portion of said valve sleeve skirt inserted in said recess and within said housing bore.

4. A method for manufacturing an electromagnetic valve, for use with hydraulic brake systems having a slip control, wherein a generally cylindrical valve sleeve closed at one end and open at the other end is mounted with a friction-locking connection between a bushing inserted into a housing bore of a valve housing and the valve housing, with a magnetic armature enclosed by the valve sleeve performing a stroke in response to a flow-applied magnetic core fixed in the valve housing, said method including the steps of deep drawing said valve sleeve from authentic, stainless steel, forming one end of said bushing with a frusto-conical surface, positioning the other end of said bushing against a shoulder in said housing bore, with the frusto-conical surface recessed in from the housing surface into which said bore enters, placing a skirt portion of said valve sleeve at said other end thereof over said frusto-conical surface of said bushing, cold forming said valve sleeve skirt portion against said frusto-conical surface of said bushing by axially displacing material of housing surrounding said bore towards said valve sleeve skirt portion to cause radial displacement over said skirt portion, forcing said valve sleeve skirt portion against said bushing frusto-conical surface to establish said connection, thereby providing a thin-walled valve sleeve of a high strength.

5. The method according to claim 4 further including the step of forming interlocking shapes on mating portions of said bushing and valve sleeve skirt portion to create a positive strengthening of said connection.

* * * * *